United States Patent
Liang

(10) Patent No.: US 8,090,417 B2
(45) Date of Patent: Jan. 3, 2012

(54) ELECTRONIC DEVICE WITH VARIABLE APPEARANCE

(75) Inventor: Meng-Hao Liang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 404 days.

(21) Appl. No.: 12/429,158

(22) Filed: Apr. 23, 2009

(65) Prior Publication Data

US 2009/0270142 A1    Oct. 29, 2009

(30) Foreign Application Priority Data

Apr. 24, 2008   (CN) .......................... 2008 1 0301293

(51) Int. Cl.
*H04M 1/00* (2006.01)
(52) U.S. Cl. ................................. 455/575.1; 455/575.8
(58) Field of Classification Search ............... 455/575.8, 455/566, 575.1; 345/179, 184
See application file for complete search history.

(56) References Cited

U.S. PATENT DOCUMENTS

| 6,215,480 | B1 * | 4/2001 | Danis et al. ................... 345/179 |
| 6,224,225 | B1 | 5/2001 | Chen |
| 7,755,605 | B2 * | 7/2010 | Daniel et al. .................. 345/156 |

* cited by examiner

*Primary Examiner* — Brian Young
(74) *Attorney, Agent, or Firm* — Altis Law Group, Inc.

(57) ABSTRACT

An electronic device includes a printed circuit board and a casing. The printed circuit board is for storing an image. The casing secures the printed circuit board and displays the image all through its outer surface. The casing includes a touch panel and a display panel. The touch panel is transparent and is for sensing touch of users and generating control signals. The display panel is under the touch panel and is for displaying the image according to the control signals.

19 Claims, 2 Drawing Sheets

ELECTRONIC DEVICE WITH VARIABLE APPEARANCE

BACKGROUND

1. Technical Field

The present disclosure relates to an electronic device with a changeable outer skin.

2. Description of Related Art

Electronic devices, such as computers, televisions, mobile phones, are popular for their entertainment services and multi-functions. After a long usage, a user may be bored with or may consider his electronic devices out of fashion, thus he may buy a new one. However, it may be cost prohibitive to buy a new electronic device or even to replace the shell or enclosure of the electronic device.

Therefore, an electronic device with a variable appearance is needed in the industry to address the aforementioned deficiency.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
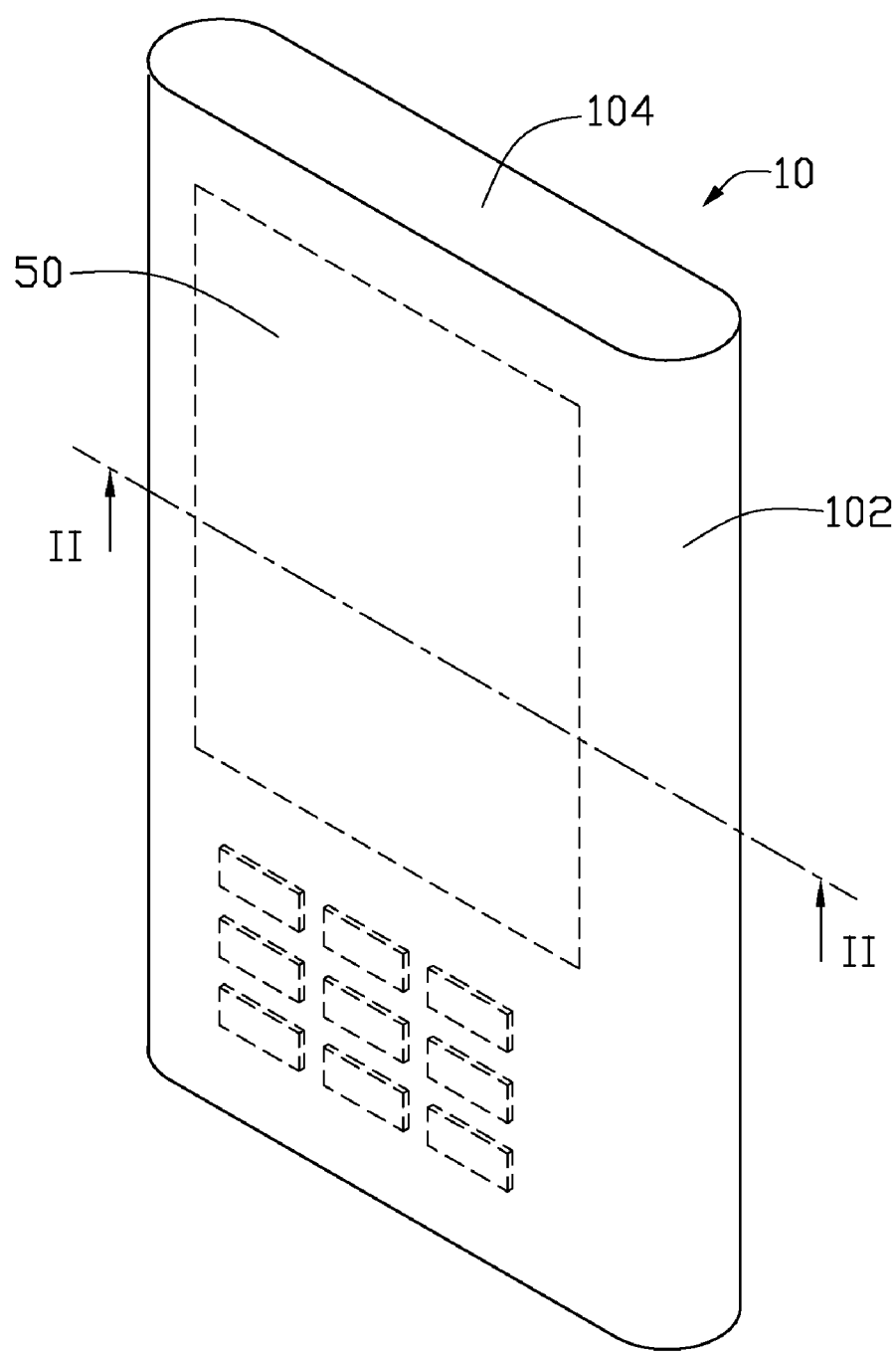
FIG. 1 is a schematic diagram showing a mobile phone in accordance with an exemplary embodiment.
Figure 2:
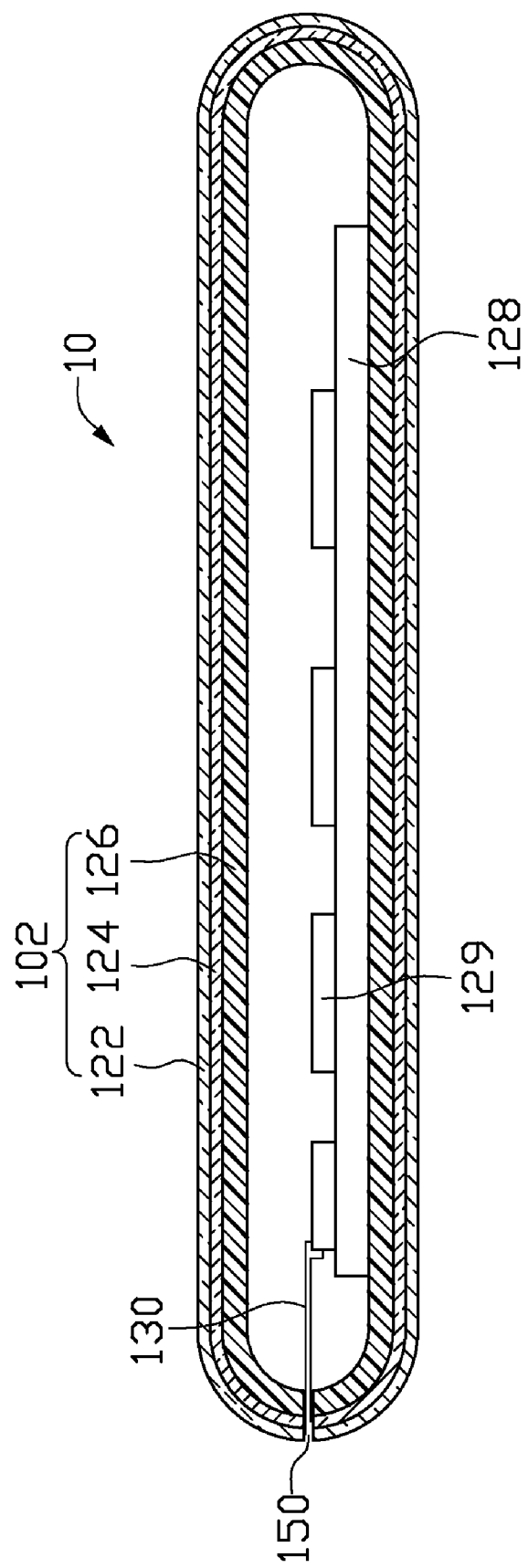
FIG. 2 is a cross-sectional view taken along line II-II of the mobile phone.

Referring to FIGS. 1 and 2, a mobile phone 10 in accordance with an exemplary embodiment is illustrated as an example of an electronic device. The mobile phone 10 includes an elliptic cylindrical plane 102 and two parallel planes 104. The elliptic cylindrical plane 102 surrounds inner components, such as a printed circuit board 128, a battery (not shown), of the mobile phone 10. The parallel planes 104 seal two open ends of the elliptic cylindrical plane 102. The elliptic cylindrical plane 102 and the parallel planes 104 compose a casing of the mobile phone, and the casing displays images through its outer surface. In the embodiment, the casing is made of a soft display material such as organic light-emitting diode (OLED). In other embodiment, the main parts of the casing may be composed of a plurality of non-deformable displays, such as cathode ray tube (CRT) displays or an array of light emitting diodes (LED).

The elliptic cylindrical plane 102 and the parallel planes 104 have the same layer-structure, and the layer-structure, of FIG. 2, of the elliptic cylindrical plane 102 is illustrated as an example. The elliptic cylindrical plane 102, in order from outside to inside, includes a touch panel 122, a display panel 124, and a supporting layer 126. In the embodiment, the display panel 124 is made of OLED. The touch panel 122 is made of transparent material, and is used for sensing touch and generating corresponding control signals. The display panel 124 is used for displaying an image received from a memory 129 of the printed circuit board 128 according to the control signals. The supporting layer 126 is made of rigid material in the embodiment, such as metal, and is used for supporting the touch panel 122 and the display panel 124. In other embodiments, the supporting layer 126 may be made of soft material or even omitted in such case the display panel 122 is composed of a plurality of non-deformable displays.

In practice, the touch panel 122 includes a plurality of touch points (not shown, but well-known structure of touch panel can be used) that can be touched to activate corresponding operations, such as removing the image displayed in the elliptic cylindrical plane 102, searching for other images in the memory 129, and setting a preferred image as the appearance of the mobile phone 10, etc.

Furthermore, a through hole 150 is defined in a side of the elliptic cylindrical plane 102. A cable 130 is disposed in the mobile phone 10, with one end connected to the printed circuit board 128, and the other end connected to the touch panel 122 and the display panel 124 via the through hole 150. The cable 130 is used for transferring signals between the printed circuit board 128, the touch panel 122 and the display panel 124. Other ways to dispose the cable 150, could be attaching the cable 150 to one of the two parallel planes 104 without defining any hole.

Therefore, users can choose preferred images, stored in the memory 129 of the mobile phone 10 or can download, and display the images in the elliptic cylindrical plane 102 by touching corresponding touch points of the touch panel 122. In addition, a user operation interface 50 is set on the elliptic cylindrical plane 102 for providing a communication to facilitate operating the mobile phone 10. There may be one or more key pads disposed under the user operation interface 50 for inputting information to the mobile phone 10. In other embodiment, the mobile phone 10 may not include the user operation interface 50 and the key pads, and may just use a predetermined display area and some touch points to take the place of the user operation interface 50 and the key pads.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device comprising:
    a printed circuit board having a memory for storing an image; and
    a casing securing the printed circuit board and displaying the image on its outer surface, the casing comprising:
    a transparent touch panel for sensing touch of users and generating control signals; and
    a display panel under the touch panel and for displaying a user operation interface for providing a communication to facilitate operating the electronic device on a predetermined display area of the casing, and displaying the image on the casing surrounding the predetermined display area according to the control signals, wherein the displayed image acts as a frame for the user operation interface, and the frame is capable of being changed to change an appearance of the casing when the displayed image is varied according to the control signals.

2. The electronic device according to claim 1, wherein the casing further comprises a supporting layer under the display panel for supporting the touch panel and the display panel.

3. The electronic device according to claim 2, wherein the supporting layer is made of rigid material.

4. The electronic device according to claim 1, wherein the display panel is made of organic light-emitting diode.

5. The electronic device according to claim 1, wherein the display panel is composed of an array of light emitting diodes.

6. The electronic device according to claim 1, wherein the casing comprises an elliptic cylindrical plane and two parallel planes, and the parallel planes seal two ends of the elliptic cylindrical plane.

7. The electronic device according to claim 6, wherein a through hole is defined in a side of the elliptic cylindrical plane.

8. The electronic device according to claim 7, wherein the casing further comprises a cable, and one end of the cable is connected to the printed circuit board, and the other end is connected to the touch panel and the display panel via the through hole.

9. A mobile phone comprising:
 a printed circuit board having a memory for storing an image and performing communication functions;
 an elliptic cylindrical plane surrounding the printed circuit board, the elliptic cylindrical plane comprising:
  a transparent touch panel for sensing touch of users and generating control signals; and
  a display panel under the touch panel and for displaying the image according to the control signals; and
 two parallel planes sealing two open ends of the elliptic cylindrical plane and being combined with the elliptic cylindrical plane to secure the printed circuit board.

10. The mobile phone according to claim 9, wherein the display panel is made of organic light-emitting diode.

11. The mobile phone according to claim 9, further comprising a supporting panel under the display panel for supporting the touch panel and the display panel.

12. The mobile phone according to claim 9, wherein a through hole is defined in a side of the elliptic cylindrical plane.

13. The mobile phone according to claim 12, further comprising a cable wherein one end of the cable is connected to the printed circuit board, and the other end is connected to the touch panel and the display panel via the through hole.

14. An electronic device, comprising:
 a printed circuit board for providing information; and
 a display panel electrically connecting to the circuit board, and acting as a casing of the electronic device for receiving the printed circuit board therein;
 wherein the display panel displays a user operation interface for providing a communication to facilitate operating the electronic device on a first predetermined display area, and displays information provided by the printed circuit board on a second predetermined display area different from the first predetermined display area, an appearance of the casing of the electronic device is changeable according to different displayed information provided by the printed circuit board.

15. The electronic device according to claim 14, wherein the display panel comprises a plurality of surfaces, the first predetermined display area is set on a first surface of the plurality of surface; the second predetermined display area is set on at least one of the plurality of surface comprising the first surface, and surrounding the first predetermined area.

16. The electronic device according to claim 15, wherein the first predetermined area and the second predetermined area on the first surface, and the first surface is flat panel.

17. The electronic device according to claim 15, wherein the plurality of surfaces further comprises two curved surfaces connecting to first opposite sides of the first surface, the second predetermined area is set on the curved surfaces and the first surface except the first predetermined area.

18. The electronic device according to claim 17, wherein the plurality of surfaces further comprises two plane surfaces connecting to second opposite sides of the first surface, the first surface is rectangular, the curved surfaces and the plane surfaces respectively extend from four edges of the first surface in the same direction, and the curved surfaces and the plane surfaces connect each other to enclose the first surface; the second predetermined area is set on the curved surfaces, the plane surfaces, and the first surface except the first predetermined area.

19. The electronic device according to claim 18, wherein the plurality of surfaces further comprises a second surface opposite to the first surface, the curved surfaces and the plane surfaces connect the first surface and the second surface to form the casing of the electronic device, the curved surfaces, the plane surfaces, the second surface and the first surface except the first predetermined area combines to form the second predetermined area.

* * * * *